(12) United States Patent
Myers et al.

(10) Patent No.: US 6,561,466 B1
(45) Date of Patent: May 13, 2003

(54) INTERCHANGEABLE HOSE, CABLE, AND CONDUIT SUPPORT MECHANISM

(76) Inventors: Mitchell W. Myers, P.O. Box 1230, Hermiston, OR (US) 97838; William R. Myers, 1997 N. First Pl., Hermiston, OR (US) 97838

( * ) Notice: Subject to any disclaimer, the term of this patent is extended or adjusted under 35 U.S.C. 154(b) by 0 days.

(21) Appl. No.: 10/082,020

(22) Filed: Feb. 20, 2002

(51) Int. Cl.[7] .................................................. F16L 3/08
(52) U.S. Cl. ..................................... 248/74.4; 248/68.1
(58) Field of Search .............................. 248/68.1, 74.1, 248/74.4, 65, 61, 316.6; 285/137.1; 174/40 R (56) References Cited

U.S. PATENT DOCUMENTS

| | | | | |
|---|---|---|---|---|
| 1,671,338 A | * | 5/1928 | Banks et al. | 248/74.4 |
| 4,006,874 A | * | 2/1977 | McGee | 248/74.3 |
| 4,199,070 A | * | 4/1980 | Magnussen, Jr. | 211/60.1 |
| 5,060,810 A | * | 10/1991 | Jones | 211/59.4 |
| 5,098,047 A | * | 3/1992 | Plumley | 248/68.1 |
| 5,205,520 A | * | 4/1993 | Walker | 248/74.1 |
| 5,261,633 A | * | 11/1993 | Mastro | 248/74.1 |
| 5,377,939 A | * | 1/1995 | Kirma | 248/68.1 |
| 6,079,673 A | * | 6/2000 | Cox | 248/63 |
| 6,135,398 A | * | 10/2000 | Quesnel | 248/74.1 |

* cited by examiner

Primary Examiner—Anita King
Assistant Examiner—Gwendolyn Baxter
(74) Attorney, Agent, or Firm—Klarquist Sparkman, LLP

(57) ABSTRACT

A support mechanism for selected sizes and numbers of cylindrical members includes a pair of substantially identical covers providing a first cavity between them, and pairs of substantially identical opposed interlocked inserts disposed in the first cavity, each of the pairs of inserts providing a second cavity to support and retain a cylindrical member. Each of the covers and inserts comprises a male fitting extending from one end and a female receptacle disposed in the other end, such that when covers and inserts are reversed top-to-bottom and end-for-end, respective male fittings engage respective female fittings to interlock covers and inserts together. Pairs of inserts can be in one or two stacks. A pair of substantially identical adapters, each comprising the same male and female fittings, extends the distance between covers to accommodate a second stack of inserts.

3 Claims, 12 Drawing Sheets

INTERCHANGEABLE HOSE, CABLE, AND CONDUIT SUPPORT MECHANISM

FIELD OF THE INVENTION

This invention relates to mechanisms and devices to support hoses, cables, conduits, and similar cylindrical and tubular items, and, more particularly, to such mechanisms and devices that can accommodate a variety of such things, including the number and sizes of them.

BACKGROUND OF THE INVENTION

Many kinds of modern machinery, for example, lift trucks and agricultural equipment, utilize hoses and other types of conduits to supply the machinery with the various fluids needed for operation. The conduits must often be attached to moving parts of the machinery. Accordingly, it is necessary not only to secure the conduits to the machinery, but also to insure that the conduits themselves do not become entangled in the moving components.

Similar support mechanisms are also required in the field of building construction where conduits carrying electrical wires and the like must be passed through walls and partitions.

Complicating the problem is the fact that for any particular use the conduits are often of varying types and sizes. Also, the number of conduits that must be accommodated vary as respects different uses.

Figure 1:
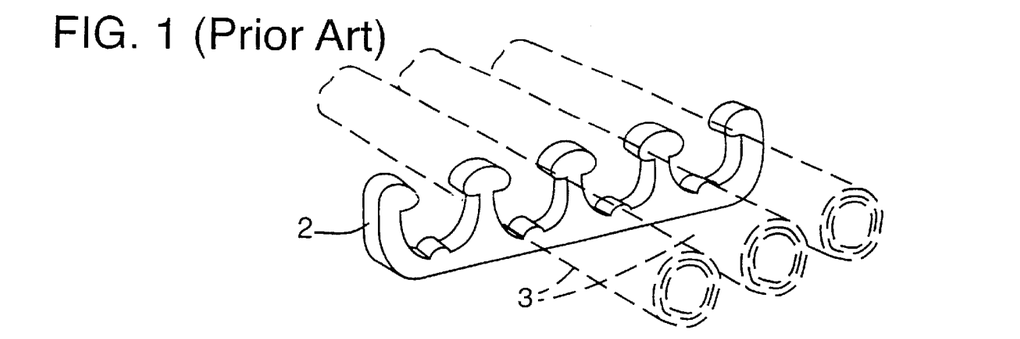
FIG. 1 is a perspective view of a conduit support bracket presently in common use with agricultural and other types of machinery, such as lift trucks and hoists of varying types.

Heretofore, a plastic support like that shown in FIG. 1 has been utilized to support hydraulic hoses on different types of machinery. This type of support, however, is restricted as to the number and sizes of hoses it can handle. Also, it does not protect hoses particularly well. Furthermore, it cannot be adapted for use in building construction where electrical conduits instead of hoses must be passed through walls and partitions. It is also severely limited in overall versatility.

Accordingly, it is the principal object of the present invention to provide a support mechanism for differing numbers, sizes and types of conduits and where the mechanism itself can be used not only with machinery, but also in other fields.

It is a further object of the present invention to provide a support of the above type that can be fabricated using a minimum number of parts, thereby to provide a versatile device at a most economical cost.

It is a still further object of the present invention to provide a support of the above type that is very easy to assemble and disassemble.

DETAILED DESCRIPTION—ONE-STACK SUPPORT MECHANISM

FIG. 1 of the drawings illustrates the prior art wherein a plastic support 2 is configured to receive and hold separate a number of conduits 3. As previously mentioned this structure is not particularly well adapted for use in other than a restricted number of applications.

Figure 2:
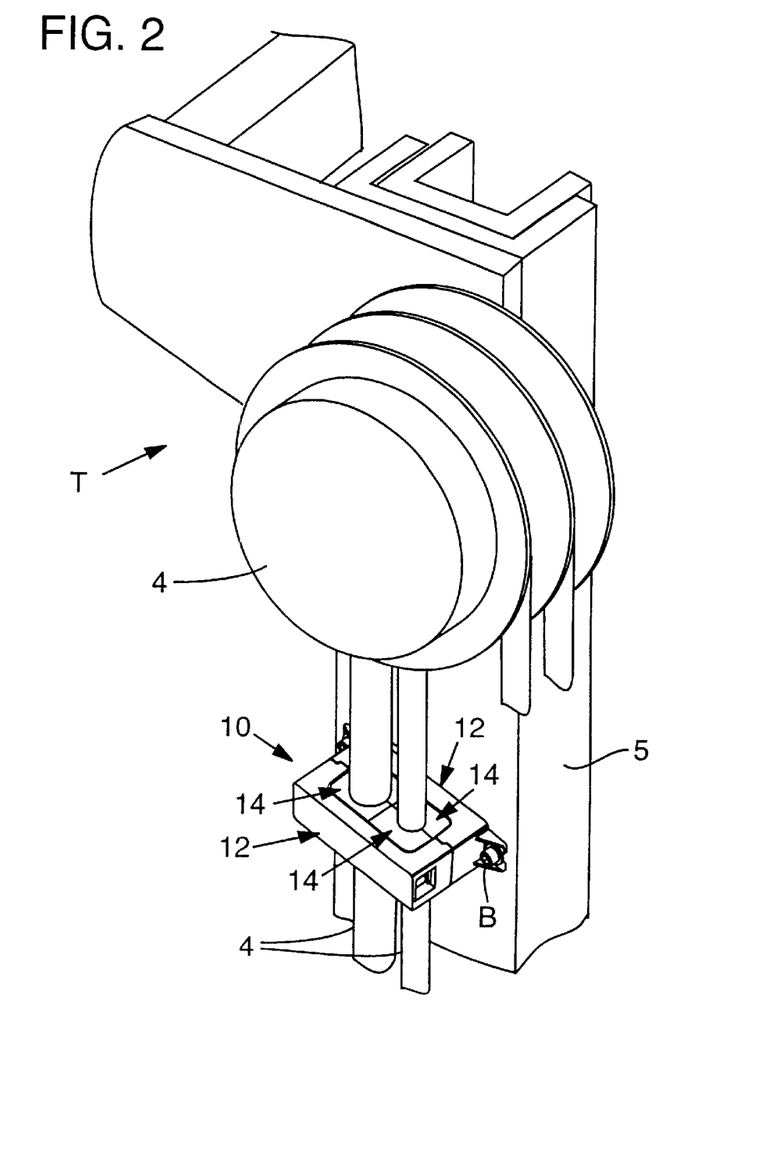
FIG. 2 is a perspective view of the support mechanism of the present invention installed on the mast of a lift truck.

FIG. 2 illustrates the present invention 10 mounted below the take-up reel 4 on the extendible upright 5 of a fork lift truck T.

More specifically, and referring to the drawings, FIGS. 3–16 illustrate a first embodiment of our support mechanism 10, this embodiment being in its most basic configuration. This embodiment is essentially a free-standing version that allows support mechanism 10 to be configured and installed without a need to mount the assembly to any solid surface. Support mechanism 10 is comprised of only two basic components: a pair of substantially identical covers 12 that provide a first cavity C between them and two pairs of substantially identical opposed inserts 14 that nest in the cavity C.

Inserts 14 provide a second cavity C' (see FIG. 8) that is adapted to support and retain a conduit of any selected size.

Covers 12 comprise extensions at their ends. A male fitting 26 extends from the extension at one end of a cover 12 and a female receptacle or channel 23 is disposed in the extension at the other end of cover 12. In this manner, covers 12 can be reversed top-to-bottom and end-for-end with respect to each other, whereby respective male fittings 26 engage respective female receptacles or channels 23 to interlock covers 12 together.

Figure 8:
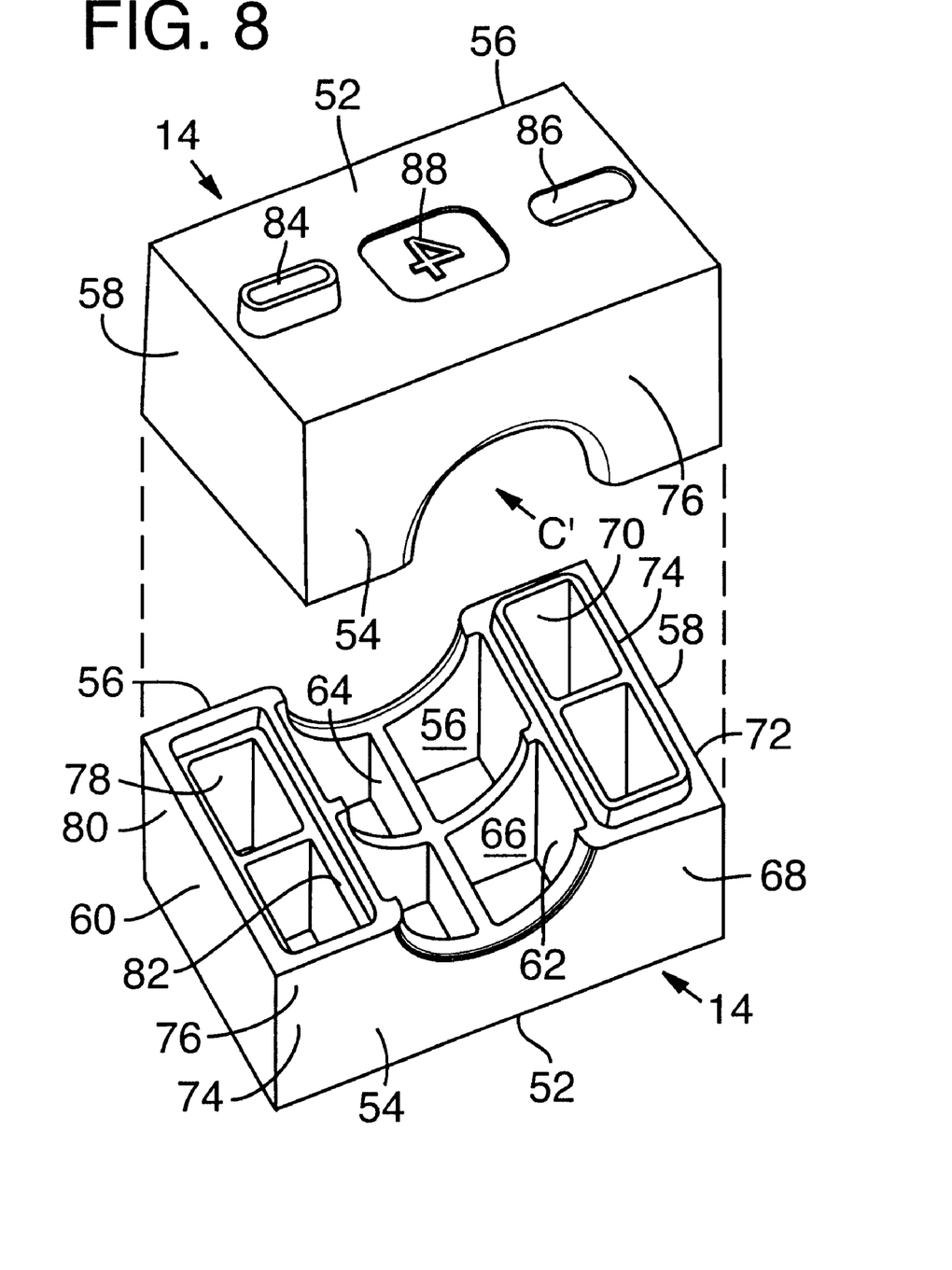
FIG. 8 is an enlarged exploded perspective view of one pair of conduit-receiving inserts utilized in the basic support mechanism.

Inserts 14 also comprise extensions at their ends. As illustrated in FIG. 8, a male fitting 74 extends from the extension at one end of an insert 14 and a female receptacle or opening 82 is disposed in the extension at the other end. In this manner, inserts 14 can also be reversed top-to-bottom and end-for-end with respect to each other, whereby respective male fittings 74 engage respective female receptacles or openings 82 to interlock inserts 14 together.

Figure 3:
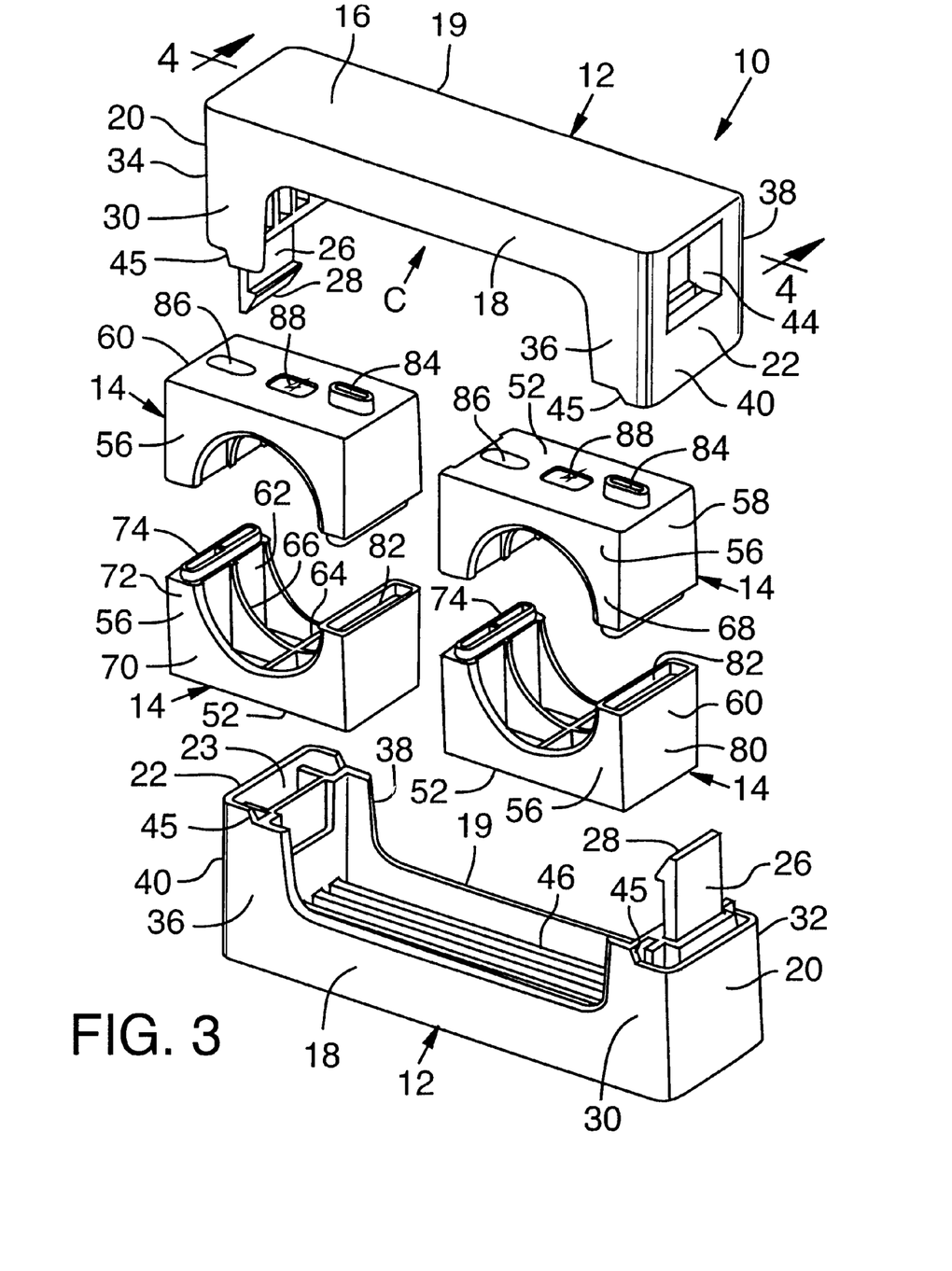
FIG. 3 is a perspective exploded view illustrating the components of our support mechanism in its basic embodiment, accommodating two conduits in two pairs of inserts in one-stack.

Referring to FIG. 3 specifically, each cover 12 is comprised of a top plate 16 and front and rear side plates 18, 19. End plates 20, 22 join top plate 16 and side plates 18, 19 to complete the exteriorly disposed structure of each cover 12. End plate 20 terminates in a shelf 24 (see FIGS. 4, 6 and 7) that extends from side plate 18 to side plate 19. A latch 26 terminating in a hook 28 comprises a male fitting that extends from shelf 24. End plate 20, shelf 24 and the end portions 30, 32 of side plates 18, 19, respectively, comprise a first end extension 34 of cover 12.

End plate 22 and the end portions 36, 38 of side plates 18, 19, respectively, comprise a second end extension 40 of cover 12. A stepped plate 42 (again see FIGS. 4, 6 and 7) extends interiorly of top plate 16. Together with end plate 22 and end portions 36, 38 of side plates 18, 19, respectively, stepped plate 42 forms a step 42a at the termination of female receptacle or opening 23 formed between end plate 22 and stepped plate 42. Female opening 23 receives male fitting or latch 26. Opening 44 in second extension 40 permits access to receive a pry bar, such as a screwdriver S, whereby hook 28 can be disengaged from step 42a in stepped plate 42 (see FIGS. 4 and 7).

Each plate 16 further comprises a plurality of interiorly disposed fins 46 (see FIGS. 3, 4 and 5) to provide transverse stability to inserts 14 as will be described hereinbelow.

As mentioned heretofore, support mechanism 10 comprises two covers 12 that are substantially identical. Each cover 12 comprises the male fitting or latch 26 extending from first end extension 34 and the female receptacle or opening 23 disposed in second end extension 40. Covers 12 can thus merely be reversed top-to-bottom and end-for-end with respect to each other whereby the respective male fittings 26 can engage the respective female receptacles or channels 23 to interlock covers 12 together.

Figure 4:
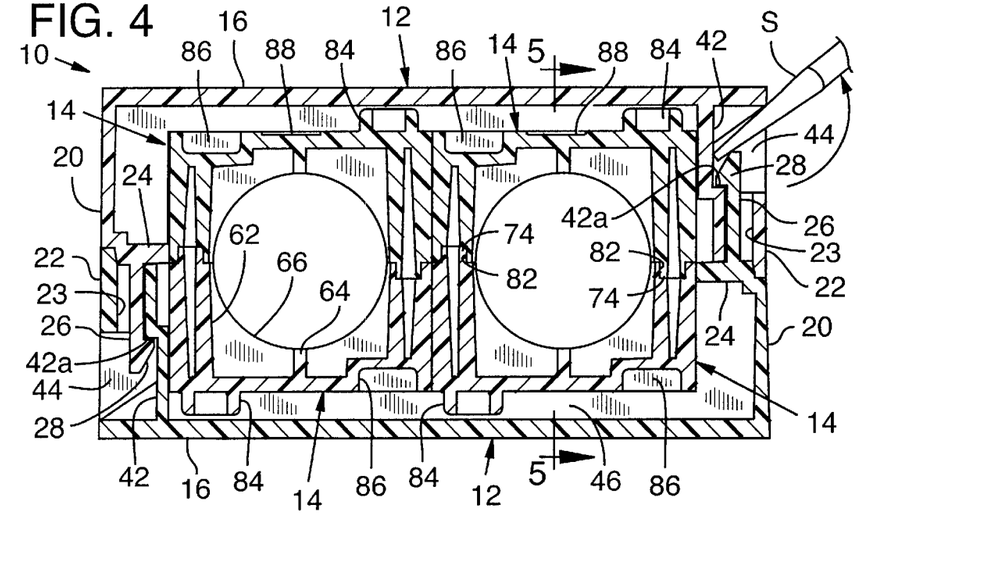
FIG. 4 is a sectional view taken on line 4—4 of FIG. 3.
Figure 5:
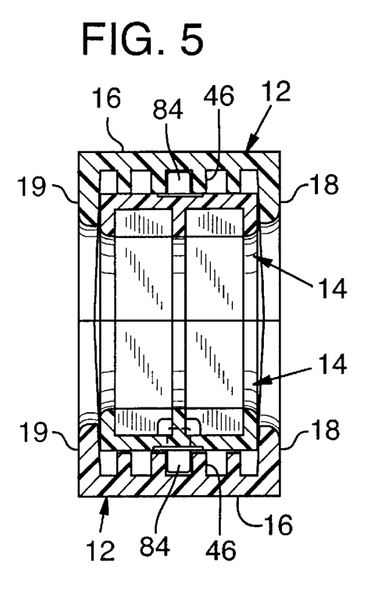
FIG. 5 is a sectional view taken on line 5—5 of FIG. 4.
Figure 6:
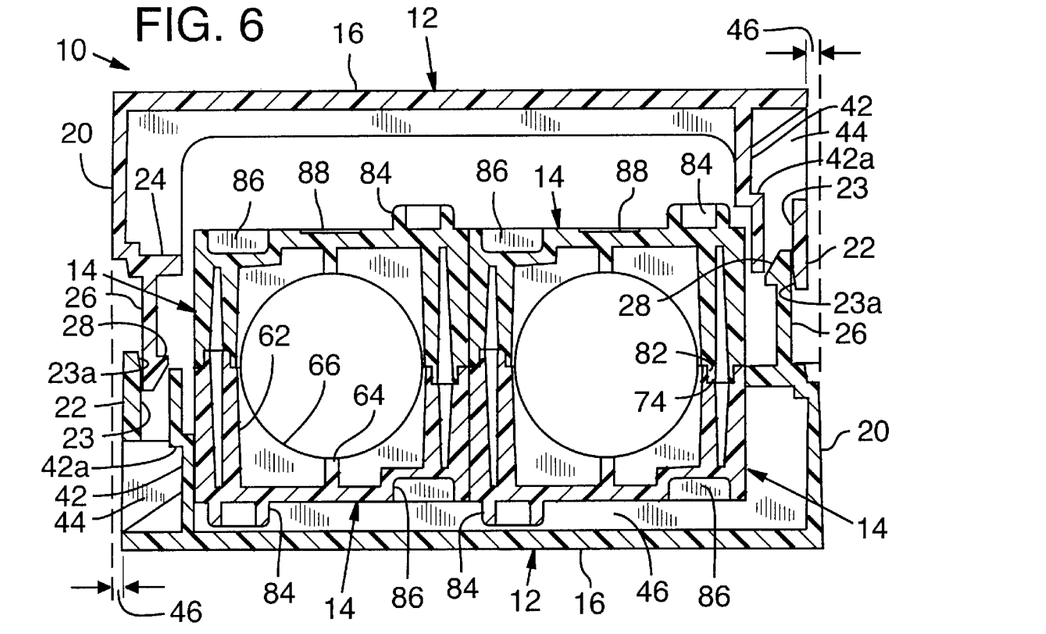
FIG. 6 is a sectional view similar to FIG. 4 illustrating the support mechanism as it is nearing final assembly.

FIG. 6 is a sectional view similar to FIG. 4, but illustrating support mechanism 10 in a position whereby covers 12 are ready to be interlocked. Latches 26 at first end extensions 34 of each cover 12 are positioned such that hooks 28 are aligned with female openings 23. Plates 22 are chamfered as at 23a to permit easy entry. It will be noted that in this position covers 12 are offset laterally a distance 46.

As covers 12 are moved closer together, latch 26 of one cover 12 is inserted sufficiently far into opening 23 of the other cover 12 (illustrated at the left-hand side of FIG. 7) to permit hook 28 fully to engage step 42a of stepped plate 42.

Figure 7:
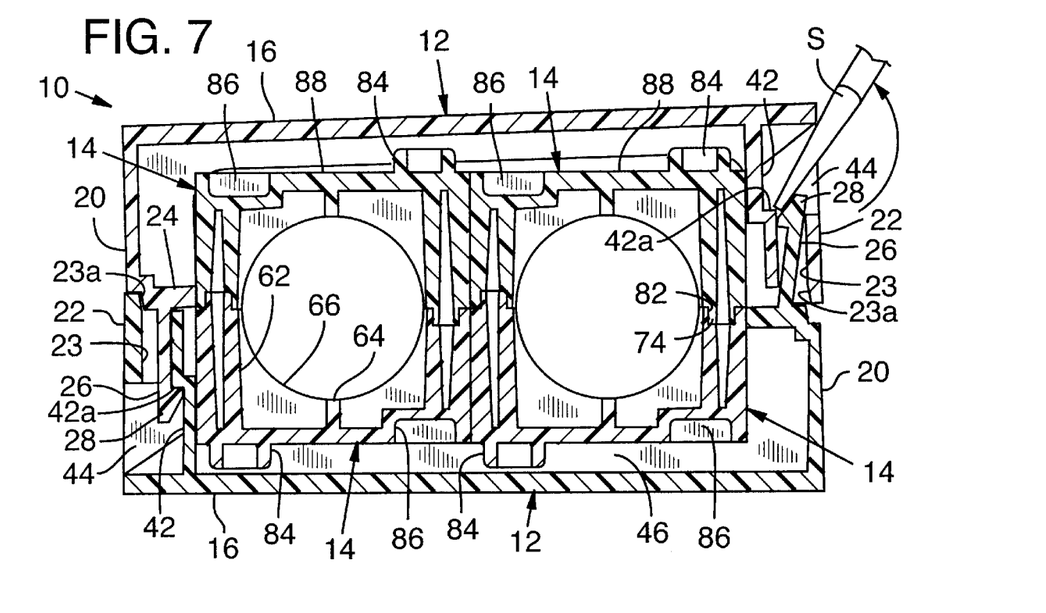
FIG. 7 is a view similar to FIG. 6 illustrating the support mechanism in the position where one side is fully assembled and the other side is ready to be snapped into place, or where the other side has just been released by means of an illustrated pry bar.

See FIGS. 6 and 7. Upper cover 12, as shown in FIG. 7, however, becomes canted with respect to lower cover 12. Latch 26 rides upwardly on chamfer 23a, then on the interior surface of plate 22, bending outwardly, as shown at the right-hand side of FIG. 7. Such continues until hook 28 of latch 26 of lower cover 12 snaps into position, becoming engaged with step 42a of stepped plate 42, whereupon the covers 12 achieve the position illustrated in FIG. 4. Covers 12 are provided with chamfers 45, preferably at 45°, see FIGS. 3, 10 and 11, whose function it is to align covers 12 as they come together. This, in effect, loads latch 26, i.e., bends it outwardly as shown in FIG. 7, as covers 12 come together. However, once latch 26 engages with step 42a to achieve the position illustrated in FIG. 4, there is no further spring loading on the latch.

When it is desired to disassemble support mechanism 10, it is sufficient merely to insert a pry bar, which might be screwdriver S, into opening 44 in end plate 22 (see FIGS. 3, 4 and 7) to bend latch 26 and release it from its respective step 42a. The spring inherent in latch 26 then forces covers 12 to snap apart.

Figures 9, 10, 11:
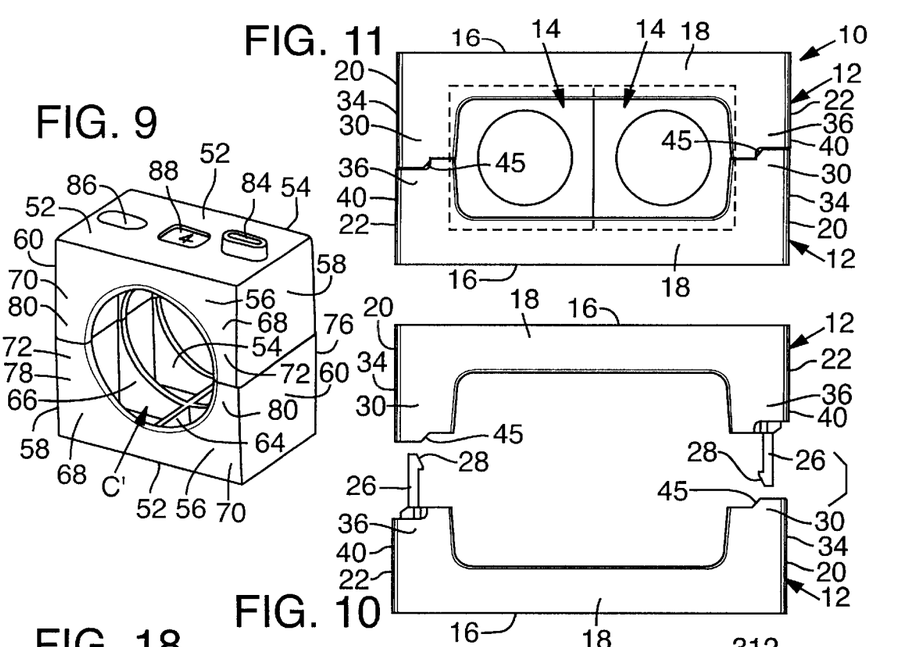
FIG. 9 is a perspective view of the pair of conduit-receiving inserts in assembled condition.
FIG. 10 is a side elevational view of a pair of the covers utilized in the support mechanism of FIG. 3 prior to assembly.
FIG. 11 is a side elevational view of the covers and inserts of the support mechanism of FIG. 3 in assembled condition.
Figure 12:
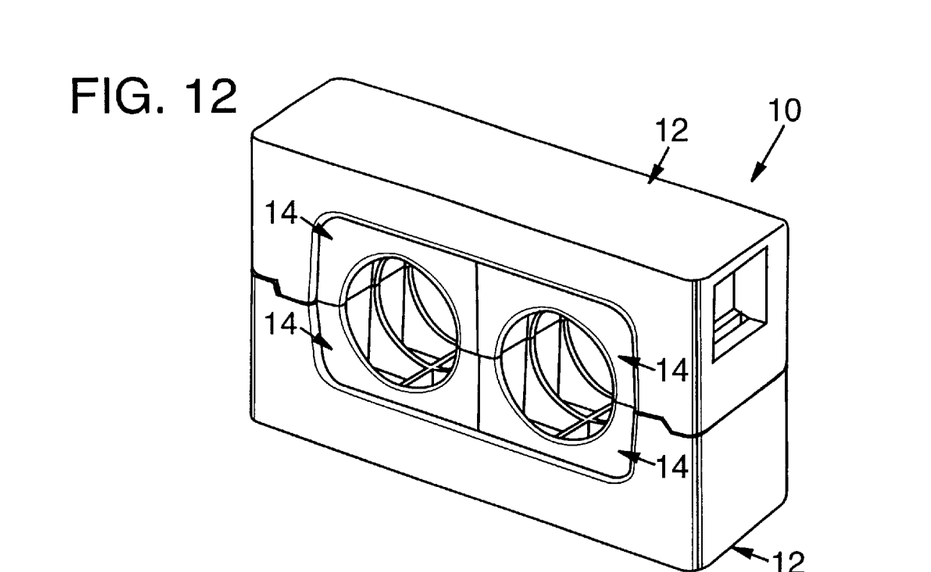
FIG. 12 is a perspective view of the embodiment of FIG. 3 in assembled condition.

Referring now to FIGS. 3, 8 and 9, inserts 14 are themselves also comprised of two identical components that are reversed top-to-bottom and end-for-end with respect to each other prior to assembly and installation in the cavity C provided by covers 12. As such, each insert 14 is comprised of a top plate 52 and front and rear side plates 54, 56 that, together with end plates 58, 60, complete the exteriorly disposed structure of each insert 14. Insert 14 is further provided with interior supporting structure comprising interior walls 62 oriented parallel to end plates 58, 60, a rib 64 oriented parallel to wall 62, and a longitudinally extending rib 66. End plate 58, together with side plates 54, 56 and wall 62, comprise a first end extension 72 of insert 14. First end extension 72 terminates in a generally rectangular extension forming a first male fitting 74.

End plate 60 and the end portions 76, 78 of side plates 54, 56, respectively, comprise a second end extension 80 of insert 14. Second end extension 80 comprises a generally rectangular female receptacle or opening 82, complementarily shaped to male rectangular extension 74. The configuration permits female receptacle 82 to receive male extension 74 to interlock the pair of inserts 14 together. See FIG. 9.

The top plate 52 of each insert 14 comprises a longitudinally extending extension 84 that serves as a second male fitting and a symmetrically oriented receptacle or opening 86 that serves as a second female fitting. See FIGS. 3 and 8. Extension 84 of each insert 14 is adapted to fit between fins 46 of covers 12 when support mechanism 10 is assembled, thereby to retain inserts 14 transversely within cavity C. See FIGS. 4 and 5. Receptacles or openings 86 are adapted to receive extensions 84 when inserts 14 are utilized in two stack embodiments, as will be described hereinafter. The two sets of inserts 14 are themselves sized longitudinally to fill cavity C longitudinally, thereby to form a compact structure suitable to retain conduits as desired. See FIG. 11.

Each pair of inserts 14 is provided with a cavity C', see FIG. 8, sized to receive a particular conduit of a standard exterior diameter. An identifying numeral in top plate 52, the numeral "4" as shown in FIGS. 3, 8 and 9, indicates, for example, that the particular insert 14 is suitable for No. 4 hose. A pair of inserts 14 may not have a cavity C', thereby suitable to be used as a blank, as will be further discussed hereinafter. See FIG. 19.

Figure 13:
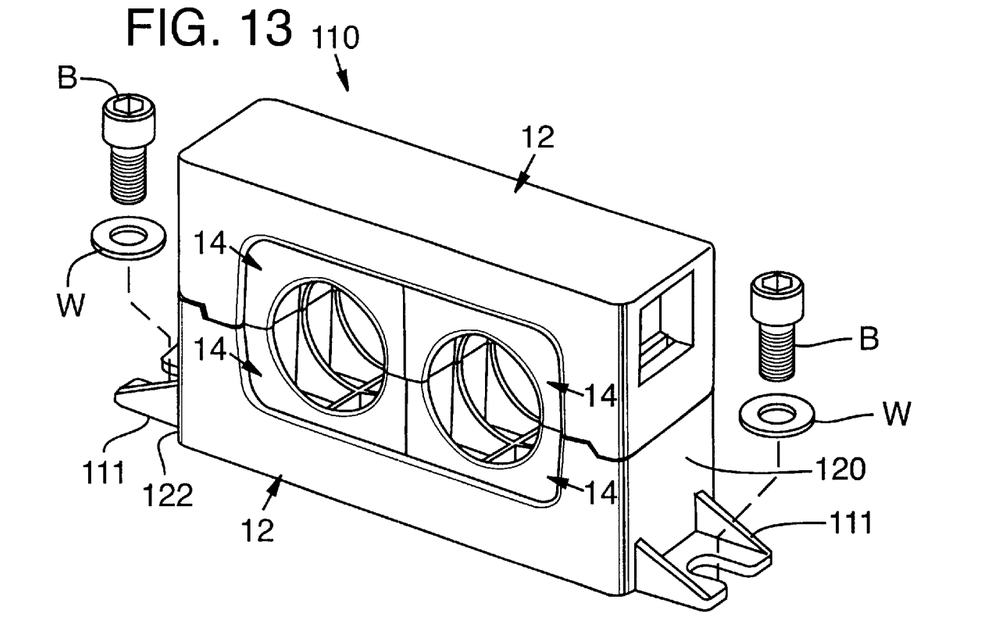
FIG. 13 is a perspective view of a first modification to the embodiment of FIG. 3 adapted for installation on machinery.

FIG. 13 illustrates a support mechanism 110 that constitutes a first modification to the basic mechanism 10. Mechanism 110 can be bolted or securely fastened to any surface, thus holding the assembly rigid. As such, a bracket 111 is molded to each of the end plates 120, 122 of one of its covers 12. Bolts B and washers W provide the means to attach mechanism 110, for example, to a component of machinery, such as upright 5 shown in FIG. 2. Otherwise, the components of mechanism 110 are identical to those of mechanism 10

Figure 14:
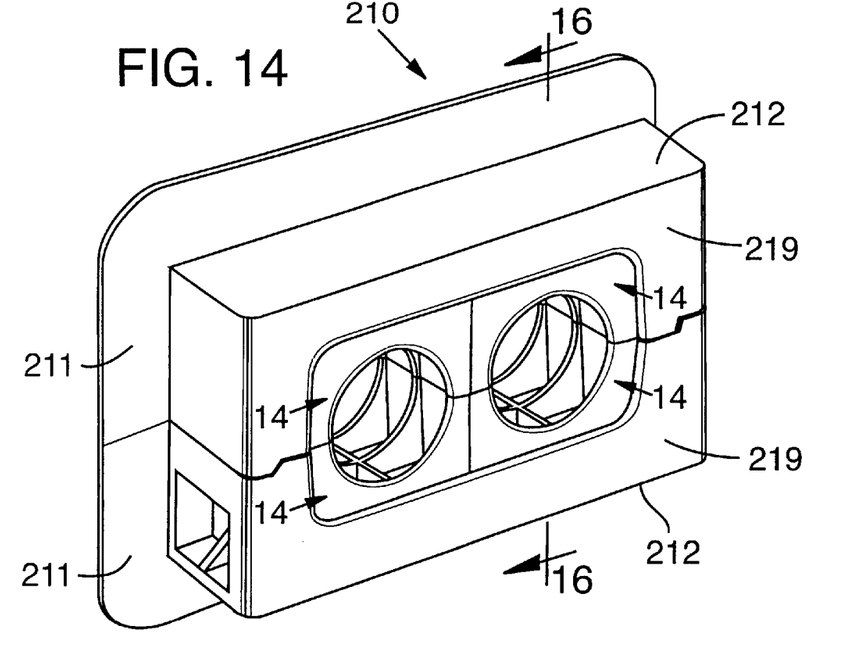
FIG. 14 is a perspective view of a second modification to the embodiment of FIG. 3 adapted for installation in building construction.
Figure 15:
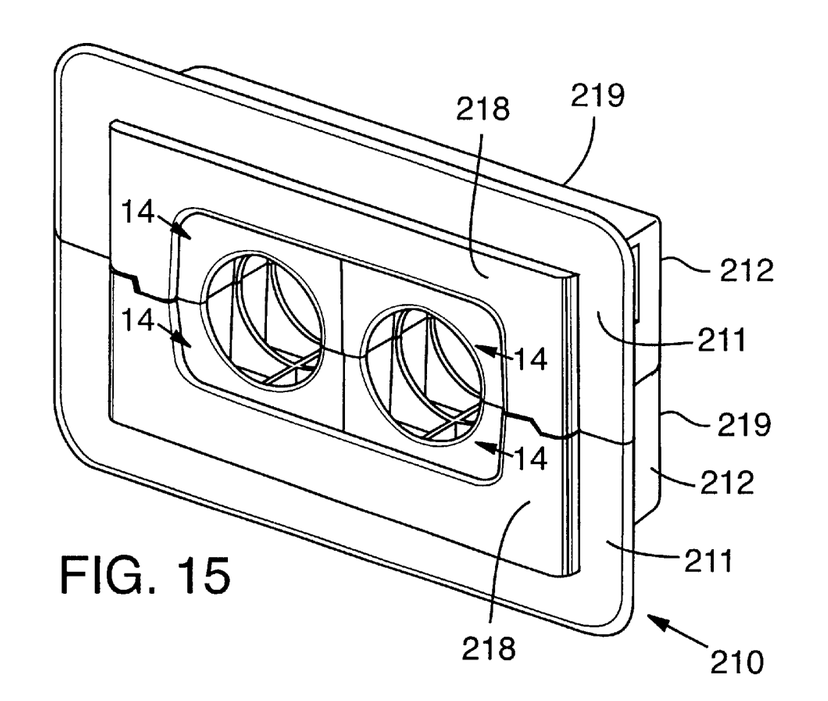
FIG. 15 is a perspective view of the opposite side of the modification illustrated in FIG. 14.
Figure 16:
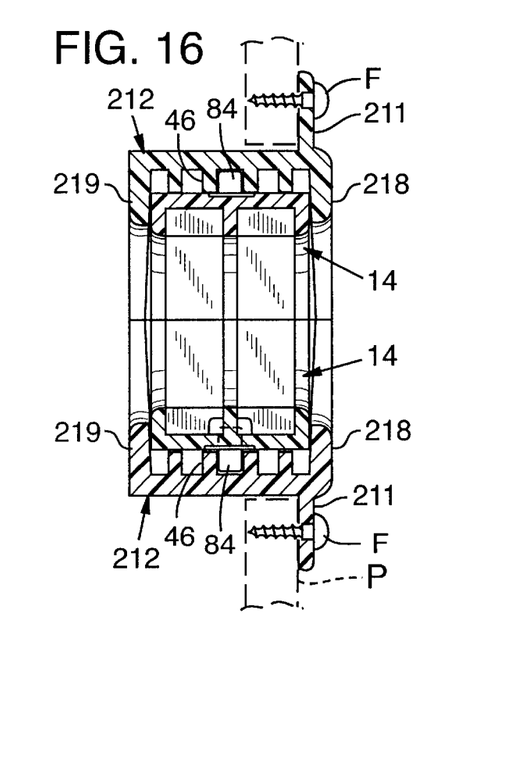
FIG. 16 is a cross-sectional view taken on line 16—16 of FIG. 14.

FIGS. 14, 15 and 16 illustrate a support mechanism 210 that constitutes a second modification to the basic mechanism 10. Mechanism 210 is adapted for attachment to a wall or partition P (see FIG. 16) to provide for support of conduits passing therethrough. This allows mechanism 210 to hold assemblies going through firewalls, bulkheads, interior and exterior walls, or other structures. To accomplish this, a flange 211 is molded to the periphery of the side plate 218 of cover 212. In this manner, when covers 212 are reversed end-for-end with respect to each other, the two flanges 211 completely circumscribe mechanism 210. Flanges 211 can then be drilled to provide for attachment to the partition P by a threaded fastener F. See FIG. 16. Otherwise, the components of mechanism 210 are identical to those of mechanism 10.

Figure 17:
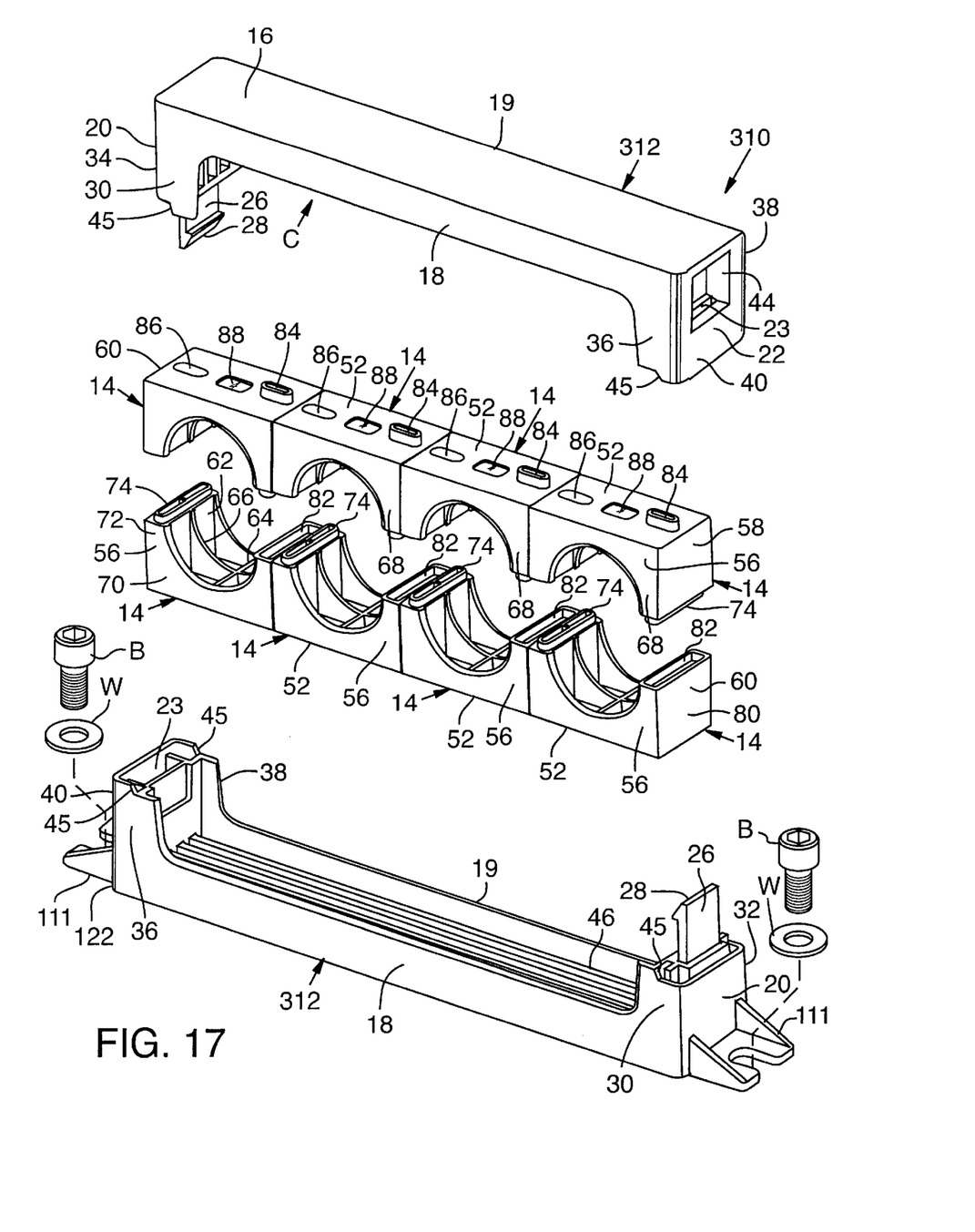
FIG. 17 is a perspective exploded view of a second embodiment of the support mechanism, this embodiment incorporating four pairs of inserts in one stack.
Figure 18:
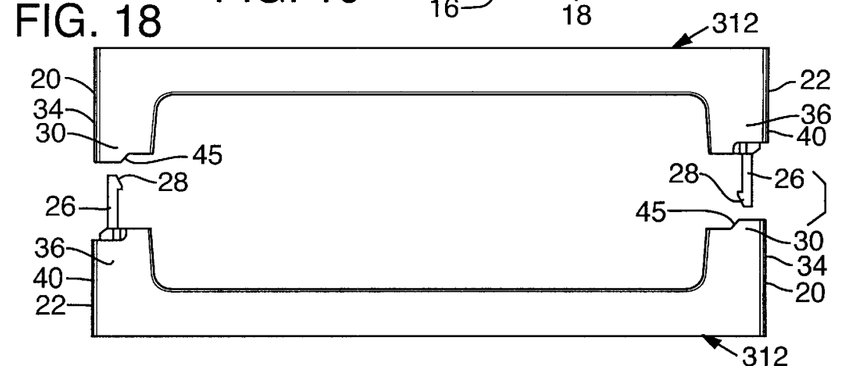
FIG. 18 is a side elevational view of a pair of the covers utilized in the support mechanism of FIG. 17 prior to assembly
Figure 19:
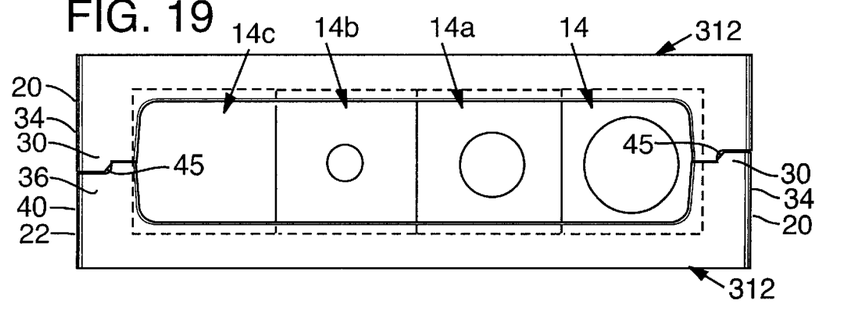
FIG. 19 is a side elevational view of the second embodiment illustrated in FIG. 17 and wherein the four pairs of inserts comprise inserts having different size cavities to accommodate conduits of different diameters.

FIGS. 17, 18 and 19 illustrate a support mechanism 310 that constitutes a second embodiment of the invention. In mechanism 310, covers 312 are expanded in length to accommodate four pairs of inserts 14 in one stack. Inserts 14 are the same as those in the previously described modifications. Other than the length of covers 312, the elements comprising them are identical to the covers of the previously described modifications. FIG. 17 is illustrated as provided with brackets 111 for attachment to machinery, as in the mechanism illustrated in FIG. 13.

FIG. 17 illustrates inserts 14 as all having the same size cavity C'. Such, however, need not always be the case. The overall size of a pair of inserts 14 must always remains constant to fit between covers, but as shown in FIG. 19, individual pairs 14, 14a, 14b, may comprise cavities C' of different diameters. Indeed, one or more individual pairs, for example, inserts 14c, may actually be a "blank", with no cavity therein at all, if the situation so requires. See FIG. 19.

DETAILED DESCRIPTION—TWO-STACK SUPPORT MECHANISM

Figure 20:
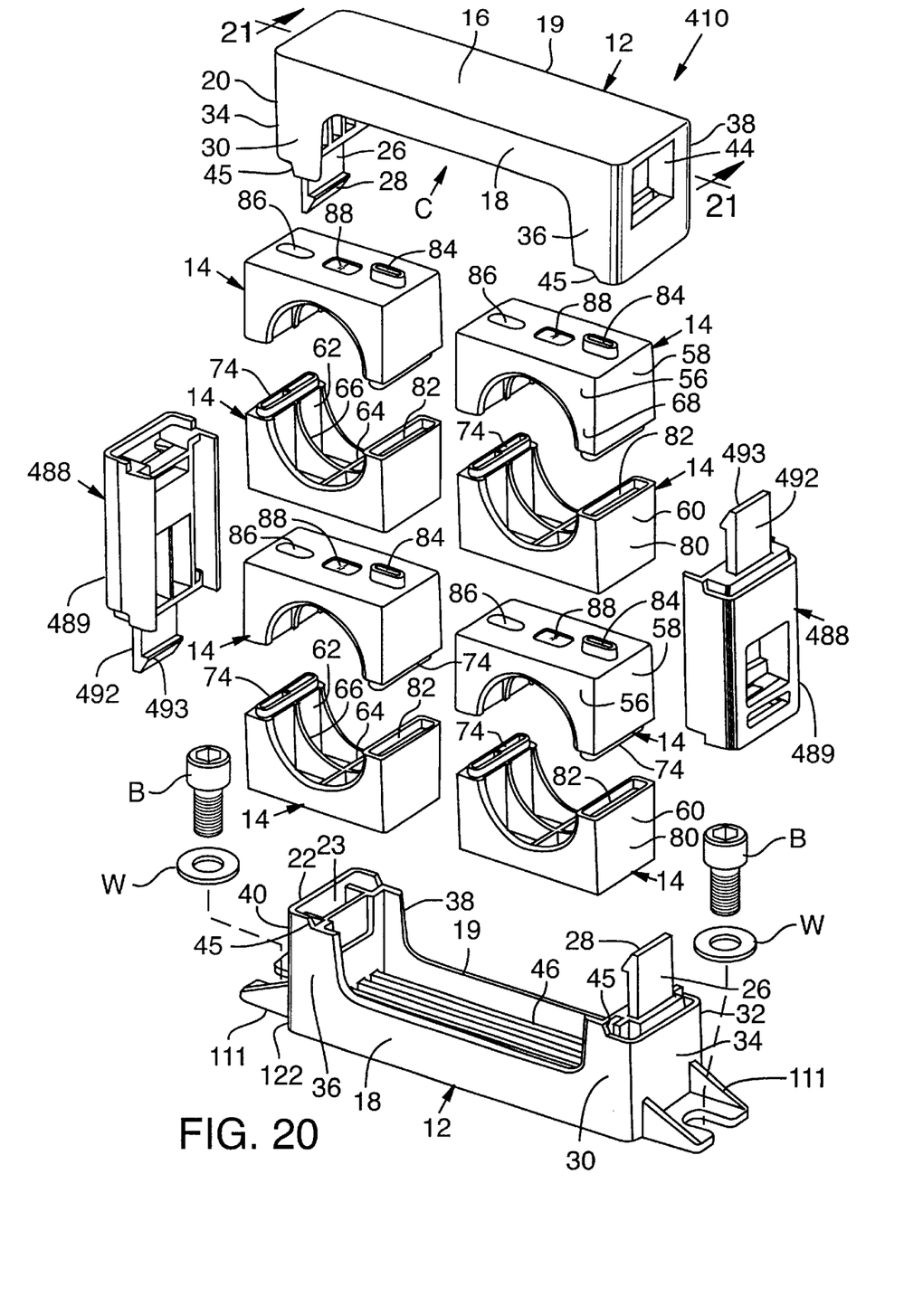
FIG. 20 is a perspective exploded view of a third embodiment of the invention, this embodiment incorporating four pairs of inserts in two stacks.
Figure 21:
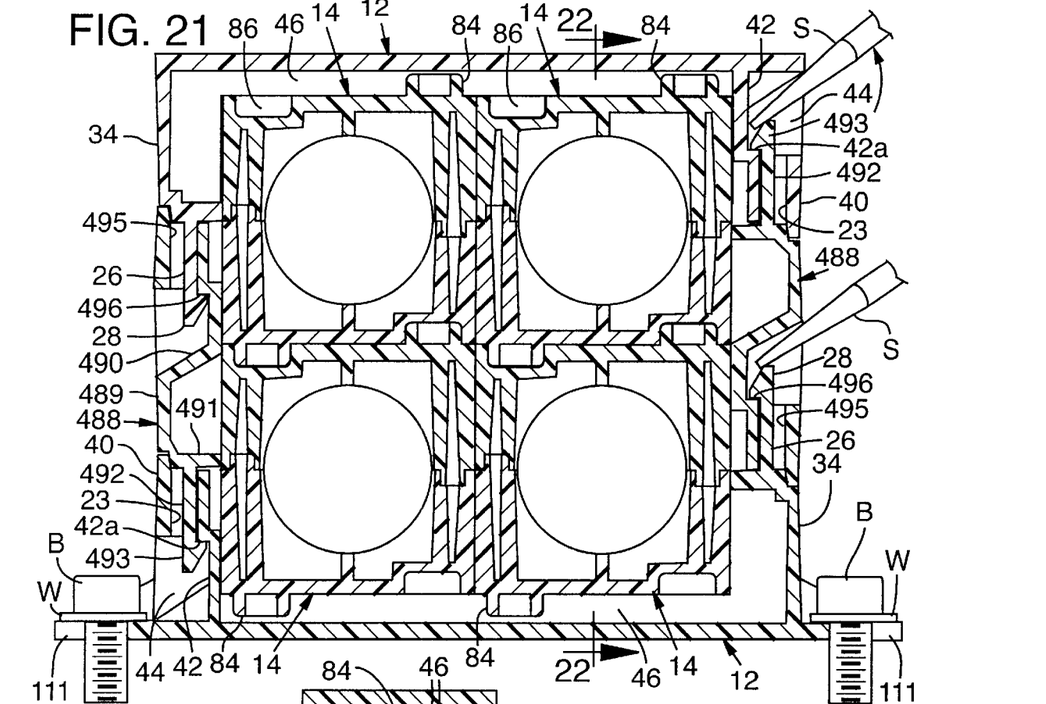
FIG. 21 is a sectional view taken on line 21—21 of FIG. 20.
Figure 22:
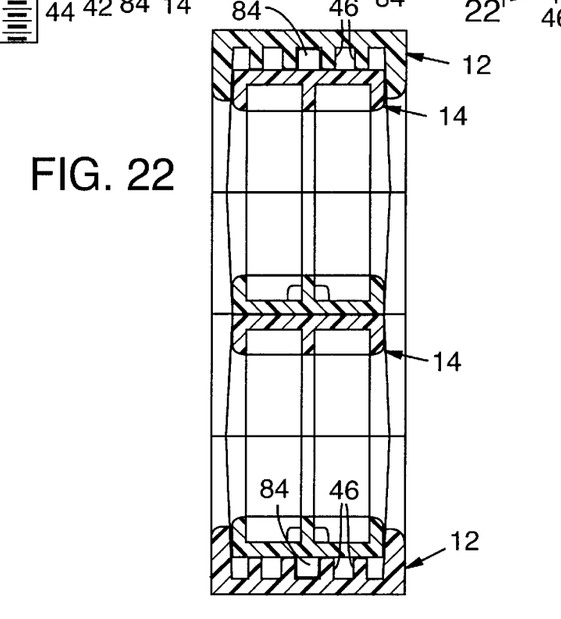
FIG. 22 is a sectional view taken on line 22—22 of FIG. 21.

Referring to FIGS. 20–22, such illustrate a support mechanism 410 constituting a third embodiment of our invention. Mechanism 410 comprises three basic components. These are: a pair of substantially identical covers 12, that are identical to the covers 12 of the first two embodiments; four pair of substantially identical opposed inserts 14, identical to the inserts 14 of the previously described embodiments; and a pair of substantially identical adapters 488. Pairs of inserts 14 are disposed between covers 12 in two adjacent stacks, instead of in one stack as in the previously described embodiments. In order to provide for the second stack, mechanism 410 utilizes the pair of substantially identical adapters 488 that comprise the third component.

As shown in FIGS. 20–22, adapters 488 are disposed between the first and second end extensions 34 and 40, respectively, of covers 12. Like covers 12 and inserts 14, adapters 488 are also reversed side-to-side and top-to-bottom. They extend the distance between covers 12 by an amount equal to the depth of the additional pair of inserts 14, as illustrated in FIG. 20.

Each adapter 488 comprises an exterior structure 489 supporting an interior bent plate 490 terminating at one end in a shelf 491 (see FIG. 21) extending from side to side. A latch 492 terminating in a hook 493 comprises a male fitting extending from the one end. Latch 492 and hook 493 are identical to latch 26 and hook 28 of cover 12.

At its other end, plate 490 comprises a stepped portion 496 (again see FIG. 21) extending interiorly of adapter 488 such that, together with exterior structure 489, end plate 490 forms a female receptacle or opening 495 in the other end of adapter 488. The configuration permits receptacle 495 to receive latch 26 of cover 12. In this manner hook 28 (the male fitting in the extension at one end of one cover 12) can engage stepped portion 496 (the female fitting in the other end of the adapter) to retain hook 28 of the male fitting. Similarly, latch 492 and hook 493 of the one end of adapter 488 can engage step 42a in stepped plate 42 to retain the male fitting of one adapter in the female fitting in the extension of the other end of the other cover 12.

Thus, the male fitting in the extension at one end of one cover engages the female fitting in the other end of a first adapter. And the male fitting of the first adapter engages the female fitting in the extension at the other end of the second cover. Similarly, the male fitting in the extension at one end of the second cover engages the female fitting in the other end of the second adapter. And the male fitting in the first end of the second adapter engages the female fitting in the extension at the other end of the first cover. In this manner the adapters enlarge the distance between the covers to receive the two adjacent stacks of inserts.

It should also be noted that, as assembled, extensions 84 of the intermediate inserts 14 of one of the adjacent stacks are adapted to be received in receptacles or openings 86 of the contacting intermediate inserts 14 of the other of the adjacent stacks. In this manner the two adjacent stacks of inserts are locked together in the FIG. 20 embodiment.

A cover 12 of the embodiment of FIGS. 20–22 may be provided with brackets 411, similar to brackets 111 illustrated in FIG. 13, to provide the means to attach mechanism 410 to a component of machinery. Or the FIGS. 20–22 embodiment may be provided with flanges 211, as illustrated in FIGS. 14–16, to provide the means to attach mechanism 410 to a wall or partition.

Figure 23:
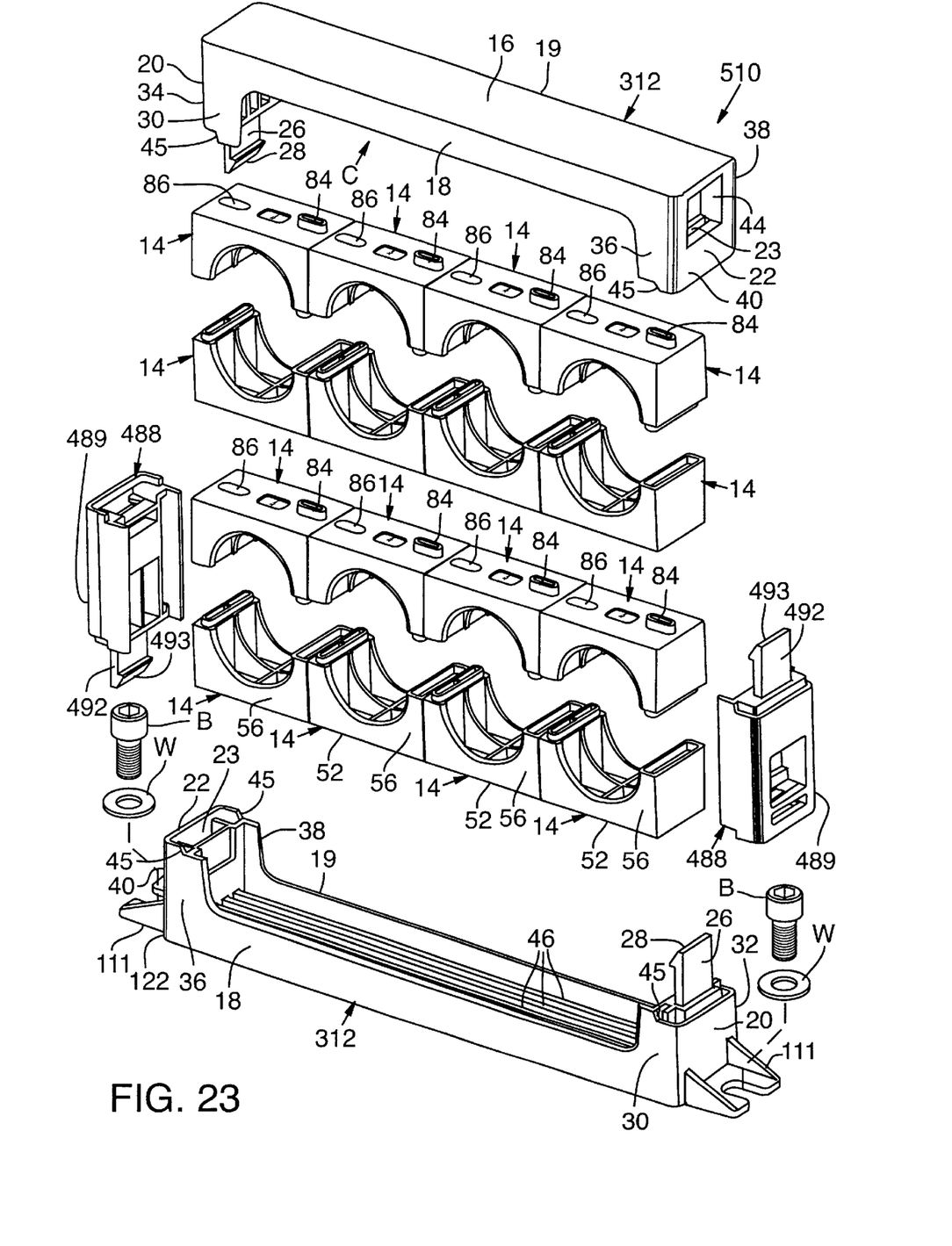
FIG. 23 is a perspective exploded view of a fourth embodiment of the invention, this embodiment incorporating eight pairs of inserts in two stacks.

Or the covers may be expanded in length as illustrated in FIG. 23 to provide an embodiment 510 that accommodates additional inserts in two stacks, just as FIG. 17 accommodated additional inserts in one stack.

The mechanisms illustrated in FIGS. 20–23 permit the respective mechanisms easily to extend and expand in seconds, providing for larger assemblies without the need to utilize additional covers.

MATERIALS AND FABRICATION

The covers and adapters used in our invention are desirably injection molded of high impact nylon, for example, E.I. du Pont de Nemours & Co. Zytel®, 101 NC010 (nylon 66). Such is an impact resistant material that gives the covers and adapters high strength, and abrasion and chemical resistance during operating conditions. The material also permits the mechanism to withstand the constant impact that many assemblies must endure.

The inserts are desirably injection molded of an olefin elastomer, for example, PRIMEFLEX T15, obtainable from Prime Source Polymers, Warren, Mich. 48089. The inserts provide the installer with the ability easily to construct an assembly of many different arrangements and configurations. This permits our invention to cross industry lines and provide customers with an ability to mix and match PVC, electrical conduit and hydraulic lines seamlessly while preventing damage from unrestrained hoses.

Among the systems easily integrated using the invention are hydraulic, pneumatic, water, oil, fuel, electrical, plumbing, chemical and telecommunication. The invention can be used with rubber, PVC, conduits of all types, cables, plastic, stainless steel, flexible metal and communication. The invention can be used in a wide variety of industries, such as electrical, telecommunication, automotive, industrial, power utilities, government, marine, chemical, MRO, OEM, food processing, agriculture, mining, trucking, aviation support, waste management, forestry, public transportation, plumbing and contractors.

Our invention thus achieves great economy in that a wide variety of multiple hose, conduits, PVC and cable assemblies may be supported by mechanisms comprising only three basic injection molded parts: the covers, the inserts, and the adapters. This simplicity provides for its overall versatility. As previously described, the design permits ready assembly and disassembly, providing an economical support that is also very easy to use.

In view of the many possible embodiments in which our invention may be implemented, it should be recognized that the illustrated embodiments constitute only preferred examples of the invention and should not be taken as limiting the scope of the invention. Rather, the invention is defined solely by following claims. We therefore claim as our invention all such embodiments as come within the scope and spirit of the following claims.

We claim:

1. A support mechanism for selected sizes and numbers of cylindrical members, the support mechanism comprising:
    a pair of substantially identical opposed covers, the covers comprising extensions at their ends, the covers comprising a male fitting extending from the extension at one end and a female receptacle disposed in the extension at the other end, the covers comprising at least one pair of parallel longitudinally disposed interior fins extending from one end to the other, the covers being reversed top-to-bottom and end-for-end with respect to each other, whereby respective male fittings are adapted to engage respective female receptacles to interlock the covers together, the covers providing a first cavity therebetween; and
    at least one pair of substantially identical opposed interlocked inserts disposed in the first cavity, the inserts comprising extensions at their ends, the inserts comprising a first male fitting extending from the extension at one end and a first female receptacle disposed in the extension at the other end, the inserts being reversed top-to-bottom and end-for-end with respect to each other, whereby the respective first male fittings are adapted to engage the respective first female receptacles to interlock the inserts together and provide a second cavity therebetween, the inserts comprising exteriorly disposed second male fittings and second female receptacles disposed between the extensions at their ends, the second male fittings being adapted to be disposed between the fins in the covers to retain the inserts transversely within the first cavity, the second cavity provided by the inserts being adapted to support and retain a cylindrical member of a selected size.

2. The support mechanism of claim 1, further comprising:
at least two pair of inserts disposed in two adjacent stacks in the first cavity between the covers; and
a pair of substantially identical adapters, the adapters being disposed between the extensions at the ends of the covers, the adapters being reversed side-to-side and top-to-bottom with respect to each other,
    the adapters comprising a male fitting extending from one end and a female receptacle disposed in the other end,
    the male fitting in the extension at the one end of one of the covers engaging the female receptacle in the other end of one of the adapters, the male fitting of the one adapter engaging the female receptacle in the extension at the other end of the other cover, and
    the male fitting in the extension at the one end of the other cover engaging the female receptacle in the other end of the other adapter, the male fitting in the one end of the other adapter engaging the female receptacle in the extension at the other end of the one cover;
wherein the adapters enlarge the distance between the covers to receive the inserts of the two adjacent stacks, the second male fittings of the adjacent inserts of one of the stacks of inserts being received by the second female receptacles of the adjacent inserts of the other of the stacks of inserts to interlock the two stacks of inserts together.

3. The support mechanism of claim 1, wherein:
the male fittings of the covers each comprises a latch terminating in a hook, and the female receptacles of the covers each comprises an opening comprising a plate having a step, wherein the hook of the latch of each respective male fitting is adapted to engage the step in the plate in the respective female receptacle to interlock the covers together.

* * * * *